United States Patent
Devlin

[11] Patent Number: 5,928,071
[45] Date of Patent: Jul. 27, 1999

[54] ABRASIVE CUTTING ELEMENT WITH INCREASED PERFORMANCE

[75] Inventor: John T. Devlin, Southbound Brook, N.J.

[73] Assignee: Tempo Technology Corporation, Somerset, N.J.

[21] Appl. No.: 08/921,778

[22] Filed: Sep. 2, 1997

[51] Int. Cl.⁶ .............................. B24B 21/23; B24B 21/12
[52] U.S. Cl. ........................ 451/547; 407/118; 175/428; 175/432; 451/551
[58] Field of Search ..................... 451/540, 541, 451/542, 547, 548, 551; 175/428, 431, 432, 434; 407/118

[56] References Cited

U.S. PATENT DOCUMENTS

| | | | |
|---|---|---|---|
| 797,427 | 8/1905 | Harris | 451/551 |
| 1,538,687 | 5/1925 | Chase | 451/551 |
| 4,604,106 | 8/1986 | Hall | 51/293 |
| 4,629,373 | 12/1986 | Hall | 407/118 |
| 5,120,327 | 6/1992 | Dennis | 51/293 |
| 5,351,772 | 10/1994 | Smith | 175/428 |
| 5,355,969 | 10/1994 | Hardy et al. | 175/432 |
| 5,379,854 | 1/1995 | Dennis | 175/434 |
| 5,484,330 | 1/1996 | Flood et al. | 451/540 |
| 5,544,713 | 8/1996 | Dennis | 175/434 |
| 5,564,511 | 10/1996 | Frushour | 175/431 |
| 5,590,728 | 1/1997 | Matthias et al. | 175/432 |
| 5,598,750 | 2/1997 | Griffin et al. | 76/108 |
| 5,617,928 | 4/1997 | Matthias et al. | 175/432 |
| 5,622,233 | 4/1997 | Griffin | 175/432 |
| 5,706,906 | 1/1998 | Jurewicz et al. | 175/428 |
| 5,711,702 | 1/1998 | Devlin | 451/540 |

FOREIGN PATENT DOCUMENTS

| | | |
|---|---|---|
| 0 655 549 A1 | 5/1995 | European Pat. Off. . |
| 0 687 797 A1 | 12/1995 | European Pat. Off. . |
| 0 688 937 A1 | 12/1995 | European Pat. Off. . |
| 2128727 | 9/1972 | Germany ............... 451/551 |
| 6-39734 | 2/1994 | Japan .................... 451/547 |

*Primary Examiner*—Timothy V. Eley
*Attorney, Agent, or Firm*—Fish & Richardson P.C.

[57] ABSTRACT

A polycrystalline diamond cutting element has a non-planar, non-linear interface between a substrate and a table. The substrate has one or more protrusions mounted on the surface of the substrate and in spaced relationship. Each protrusion has a generally curved shape such as a delta or triangular shape that extends from the center of the substrate toward the perimeter of the substrate. The depth of the groove between protrusions generally increases along the path toward the perimeter of the element. Similarly, the depth of each protrusion from groove to groove varies along the path toward the perimeter of the element. A thicker, superhard layer such as a diamond layer is provided toward the circle of the element to increase working life. The resulting cutting element is symmetrical about the central axis to alleviate the need for proper orientation of the cutting element during assembly into a drill bit. In another embodiment, a depression is used in place of the protrusion to form a substrate. In the second embodiment, the width of the depression as well as the depth of walls between depressions generally increases along the path toward the perimeter of the element.

20 Claims, 4 Drawing Sheets

ABRASIVE CUTTING ELEMENT WITH INCREASED PERFORMANCE

BACKGROUND OF THE INVENTION

The present invention relates to cutting elements with non-planar interfaces, and more specifically, to cutting elements with non-planar, non-linear interfaces.

Industrial applications such as subterranean drilling, cutting, machining, milling, grinding, and other highly abrasive operations require tools with a high resistance to abrasion, wear and percussion. In these instances, abrasive compacts or cutting elements designed specifically to withstand the highly abrasive operations are deployed.

Typically, these cutting elements are made up of facing tables with superhard abrasive layers mounted on substrates made from a less hard material. The substrate or mounting layer is typically made of a metal carbide material such as tungsten carbide, while the superhard abrasive layer is typically made of fine crystals of synthetic or natural diamond, cubic boron nitrite (CBN), wurzite boron nitrite, or combinations thereof. The cutting element is mounted on a carrier which is typically a cylindrical stud or post. One surface of the substrate is brazed to the carrier surface and the resulting stud is positioned in a socket in the body of the drill bit. Alternatively, the substrate itself may be of sufficient thickness as to substitute for the cylindrical stud to be directly received in a socket of the bit body.

The abrasive layer of the cutting element is typically created by a process known as sintered bonding or sintering where polycrystalline diamond (PCD) crystals are subjected to a combination of high pressure and high temperature processes, or alternatively, to chemical vapor or physical vapor deposition processes, such that an intra-crystalline bonding occurs. More details on the sintering process is disclosed in U.S. patent application Ser. No. 08/703,864, entitled "Curve Cutter with Non-Planar Interface", issued on Jan. 27, 1997 to John T. Devlin and assigned to the assignee of the present invention, herein incorporated by reference.

The bonding of the substrate to the polycrystalline material occurs under a temperature in excess of 1,300° C. Subsequently, as the cutting element cools down, the substrate may shrink faster than the polycrystalline material layer due to differences in coefficients of thermal expansion. The differential shrinkage leads to residual shear stresses between the substrate and the PCD layer. As such, thermally-induced stress points may exist between the substrate and the table. In addition, local tensile stresses may be introduced into various regions in the outer cylindrical surface of the substrate and internally in the substrate. These stress points generally reduce the sintered bond strength of the polycrystalline material.

Further, during use, failures are often brought about by impact forces that release stress in the form of fractures in the compact. These fractures lead to a separation or a delamination of the polycrystalline material from the substrate material, as well as a fracture of the substrate during operation. Hence, the presence of stress points introduced during the formation and mounting of the cutting element, when augmented by stresses attributable to the loading of the cutting element during operation, may cause spallings, fractures, or delaminations of the diamond table from the substrate. These failure modes are likely to lead a complete failure of the PCD element.

Additionally, as the cutting element wears during use, a flat surface forms on an edge of the cutting element. As the flat formation increases in size due to wear, the carbide section of the cutting element receives greater stress and therefore wears at an accelerated pace. The wearing of the carbide support can decrease the cutting efficiency of the assembly and eventually results in a premature equipment failure. To overcome this problem, a thicker diamond layer has been specified to improve the operating life of the cutting element. However, as the thickness of the diamond table depends in part on the availability of bonding surface on the substrate, such attempts generally lower production yields and result in more expensive cutting elements.

A number of cutting element configurations have been developed to overcome the aforementioned problems. To improve the bond between the superhard material and the substrate, certain cutting elements have modified the shape of the superhard material's rear face from a flat configuration to a non-planar configuration to provide a better mechanical interlock between the superhard material and the substrate. Other attempts have focused on applying a non-planar interface (NPI) geometry such as ridges to increase the interfacial area between the superhard material and the substrate, as well as creating an interlocking mechanism between the materials. The ridges improve the bonding between the table and the substrate by accommodating distortions generated during the sintering process as well as the subsequent bonding of the cutting element onto a carrier. The distortions are generally caused by differences in coefficients of thermal expansion and elastic moduli between the superhard material of the facing table and the less hard material of the substrate.

Yet other NPI cutting elements employ one or more constant cross-sectional grooves or channels on the abrasive layer that communicate with corresponding channels or grooves on the substrate. However, the use of parallel grooves at the interface as a mechanical interlock is not ideal, for parallel ridges or similar perturbations may be less resistant to shear stresses in the direction of the grooves. This in turn requires that the cutter be properly oriented in the drill bit in order to realize the improved mechanical interlocking feature.

Other NPI cutting elements provide sinusoidal-like grooves that run perpendicular to the longitudinal axis of the cutting element. Additionally, some NPI cutting elements, as in U.S. Pat. No. 5,357,772, provide grooves that run radially to or in a circular fashion along the longitudinal axis of the cutting element. Yet other NPI cutting elements, as in U.S. Pat. No. 5,355,969, position concentric annular rings that expand outwardly from the center of the interface to increase available bonding surface area. In these elements, a wearing of the circular grooves and concentric annular rings causes a more rapid formation of wear flat on the cutting element and therefor reduces the cutting performance of the tool in formation drilling applications.

Certain other cutting elements use a curved or domed interface to increase the bonding area between the superhard material and the substrate. The domed interface increases the volume of the superhard material available for abrasive tasks. The domed surface for PCD formation is typically deployed with a transition layer between the substrate and the diamond layer, as discussed in U.S. Pat. No. 4,604,106. This is an attempt to reduce the differences in a co-efficient of thermal expansion (CTE) and an elastic modulus between the two materials. However, the spalling and delamination of the cutting element still exist. Moreover, the transition layer approach results in an inefficient sweep of a binder material from the substrate to the diamond and therefore impedes manufacturability.

The failure in the cutting element due to the aforementioned problems may necessitate a retooling of the drill bit in the field. When costs associated with equipment downtime, labor and replacement are considered, such failures are undesirable, especially in the case of deep-well and off-shore drilling applications.

SUMMARY OF THE INVENTION

A cutting element has a substrate with one or more non-planar, non-linear protrusions concentrically mounted on a surface and spaced apart. The cutting element also has a table made of a superhard material bonded to the substrate. The table has one or more depressions adapted to engage the one or more non-planar, non-linear protrusions.

In one aspect, each protrusion has a generally curved shape such as a delta or triangular shape that extends from the center of the substrate toward the perimeter of the substrate.

In another aspect, the depth of the groove between protrusions generally varies along the path toward the perimeter of the element. Similarly, the depth of each protrusion from groove to groove varies along the path toward the perimeter of the element.

In yet another aspect, a thick, superhard layer such as a diamond layer is provided toward the perimeter of the element to increase working life. The resulting substrate is symmetrical about the central axis to alleviate the need for proper orientation of the cutting element during assembly into a drill bit.

In a second embodiment, a depression is used in place of the protrusion to form a substrate. In the second embodiment, the width of the depression as well as the depth of walls between depressions generally varies along the path toward the perimeter of the element.

In yet another aspect, the substrate is bonded to the table using one or more metallic additives mixed with the PCD layer. The metallic additives may include W, VC, WC, TaC, Cr, Ti, Co, and Ni. These metallic additives serve to improve the manufacturability of these non-linear products by providing a more evenly distributed binder phase material, an inhibitor of graphitization of the tungsten carbide and/or a seed site for diamond nucleation and diamond growth.

Advantages of the invention include the following. The nonlinear profile of the substrate distributes residual stresses caused by inherent differences in material properties more evenly and over a larger surface. The non-linear interfacial surface reduces shear stress as applied to the interface during use. Additionally, the enhanced mechanical interlocking enhances the stability and the performance of the cutting element. The resulting high resistance to impacts during the drilling cycle translates into a longer bit life. Furthermore, the non-constant cross-sectional surface increases the interfacial area between the two materials, allowing for a thicker superhard layer to be provided to increase the operating life of the element. The symmetry of the cutting element about its center alleviates the need for a proper orientation of the cutting element during its assembly into a drill bit. Additionally, stress between the substrate and the polycrystalline is minimized, thus reducing fractures or delaminations of the superhard material from the substrate during manufacturing, mount or operation of the element.

BRIEF DESCRIPTION OF THE DRAWINGS

The invention will become apparent from a consideration of the following detailed description presented in connection with the accompanying drawings, in which.

DESCRIPTION OF THE PREFERRED EMBODIMENTS

Definition

The following definitions apply to specific terms used in describing cutting elements discussed below:

Non-linear: a characteristic of a structure with a continuous surface and whose cross section does not lie in any one plane.

Non-planar: a characteristic of a structure whose surface does not lie in a single plane.

The Cutting Element

Figure 1:
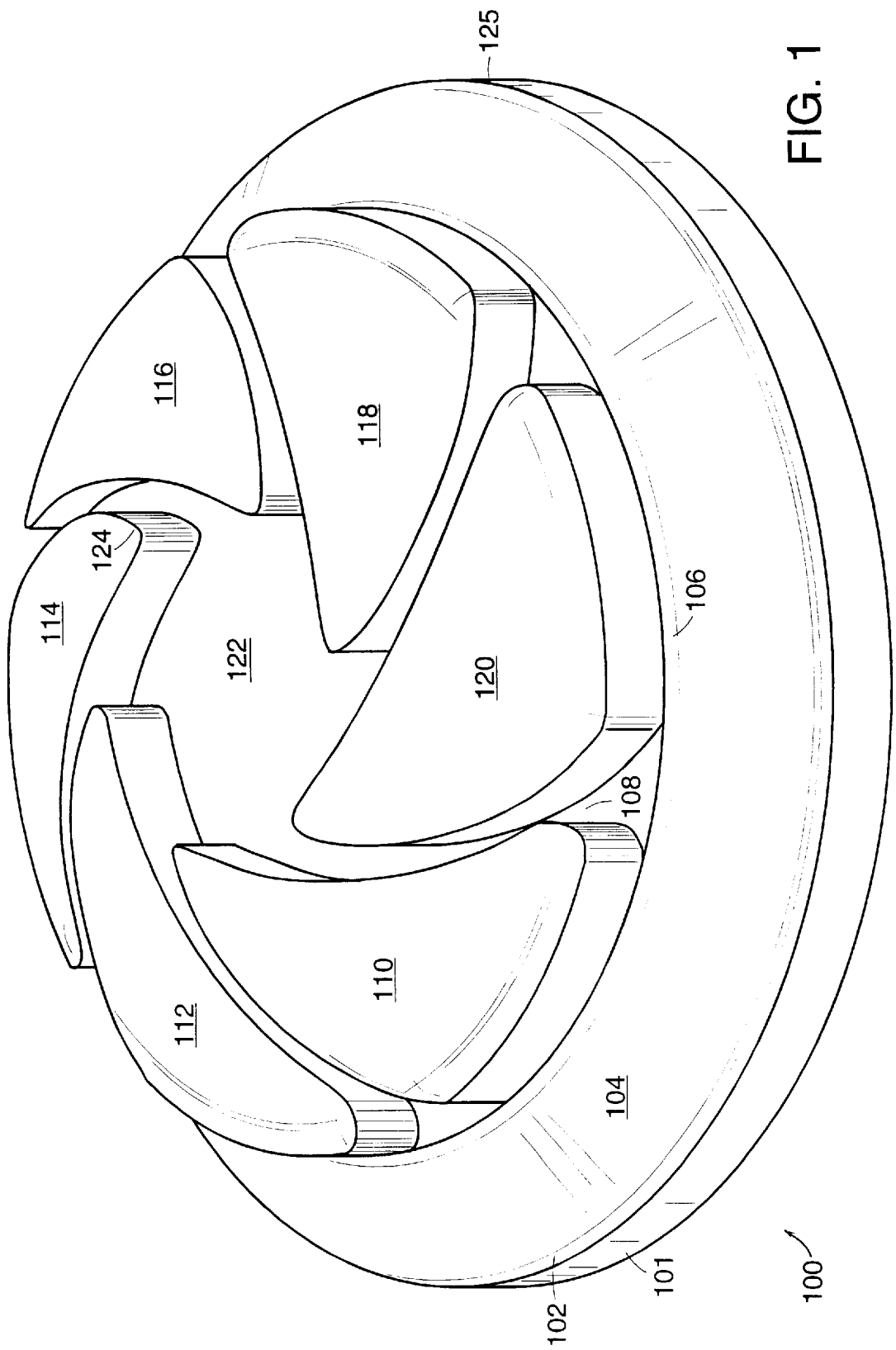
FIG. 1 is a perspective view illustrating a PCD substrate with concentric, spaced protrusions.

Turning now to the drawings, FIG. 1 illustrates a substrate 100 of a composite PCD cutting element. The substrate 100 has a generally cylindrical base 101. The base 101 supports a generally curved surface 104. In the embodiment of FIG. 1, the curved surface 104 is convex, although other shapes such as concave, pyramidal, hemispherical, circular may be used. An outside perimeter groove 102 is formed at an interface between the base 101 and the curved surface 104. Mounted on the curved surface 104 are a plurality of non-linear protrusions 110, 112, 114, 116, 118 and 120. These non-linear protrusions are symmetrical in relation to a central axis 122 of the substrate. Each of the protrusions 110–120 is of a delta or triangular shape, although other curved shapes may be used. As protrusions 110–120 are mounted on the curved surface 104 which slopes downwardly at the perimeter of the substrate 100, the protrusions 110–120 provide increased surfaces toward the perimeter which allows a thicker superhard layer such as the PCD layer to be provided toward the circumference of the element to increase working life.

In the embodiment of FIG. 1, each of the generally delta or triangular shaped protrusions 110–120 has an apex 124 positioned on an inner circle 123 whose center is the central axis 122. For illustrative purpose, the following discussion of the protrusion 120 applies to all protrusions 110–120. From the apex 124, the protrusion 120 projects outwardly from the inner circle 123 toward an outer circle 125 in a generally curved fashion and in spaced relationship with the remaining protrusions.

As the curved surface 104 is curved, a width W, as measured between sides of the protrusion 120, increases as the protrusion 120 unfurls from the apex 124 toward the outer perimeter 125. Additionally, the depth D of the protrusion 120 also increases as the protrusion 120 unfurls from the apex 124 toward the outer perimeter 125. As the curved surface 104 is convex, the protrusion depth generally increases from the central axis 122 toward the perimeter 125. As the protrusion 120 resides on a generally convex surface 104, even though the depth D as measured from the top to the base 101 of the substrate 100 is generally increased from the apex 124 toward the perimeter 125, the overall curvature of the assembly is still downwardly sloped so that a thicker superhard layer or diamond layer exists toward the perimeter of the entire element to increase the working life. Variations in the depth D of the protrusion 120 thus provides more space to receive the superhard material when they are bonded to the tungsten carbide.

Figure 2:
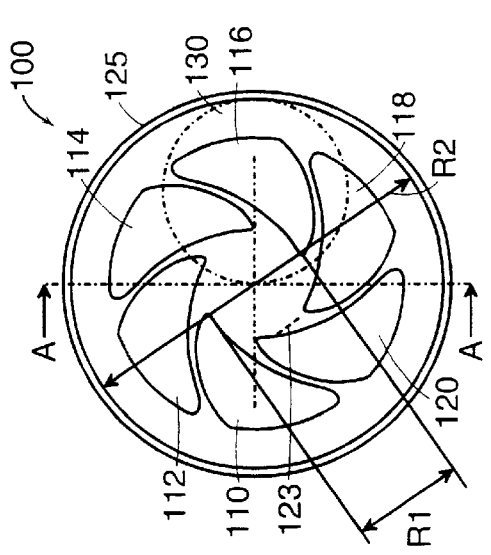
FIG. 2 is a front view of the substrate of FIG. 1.

Referring now to FIG. 2, a front view of the substrate 100 of FIG. 1 is shown. In FIG. 2, the outside perimeter groove 102 resides at a perimeter of the substrate 100. Additionally, the plurality of delta protrusions 110–120 are mounted concentrically on the surface of the substrate 100. Each of the protrusions 110–120 has a non-linear shape that generally resembles a triangle or delta whose apex is positioned on the inner circle 123 having a radius R1 and the outer circle 125 whose radius is R2. Additionally, each of protrusions 110–120 is separated by an inlet 108. The inlet 108 separating protrusions 110 and 120 is wider at the apex 124 than at the base 127 of the protrusion 120.

Figure 3:
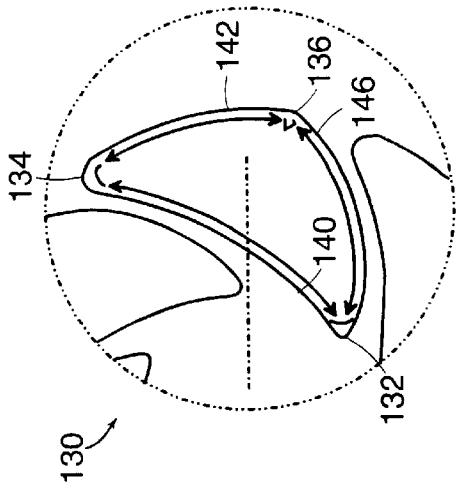
FIG. 3 is a front view illustrating an expanded portion of the substrate of FIG. 2.

To illustrate more details on the protrusions 110–120, a portion 130 of the substrate 100 is shown in more detail in FIG. 3. The portion 130 of the substrate 100 of FIG. 2 covers the protrusion 116. The protrusion 116 takes the shape of a generally non-linear delta or triangle having an apex 132 which is positioned on the inner circle 123 of the circle with radius R1 (FIG. 2) and base points 134 and 136 of the base 127. Points 134 and 136 are positioned on the outer circle 125 with radius R2 (FIG. 2). Furthermore, each of points 132, 134 and 136 is formed as smooth, curvilinear transitions to avoid sharp edges which may increase the stress within the substrate 100 during operation. Additionally, edges 140, 142 and 146 linking the apex 132 and base points 134 and 136 respectively are also curvilinear. The segment 140 has a curvature of about 46°, the segment 142 has a curvature of about 41°, and the segment 146 has a curvature of about 68°. The variations in depth and curvature lead to the non-constant cross-sectional sectional surface increases the interfacial area between the the substrate 100 and the attached superhard layer. Furthermore, due to the placement of the protrusion 116 relative to its neighbors 114 and 118, the groove 108 channeling between protrusions 114 and 116 generally becomes narrower as the channel 108 approaches the outer perimeter 125 of the cutter 100.

Figure 4:
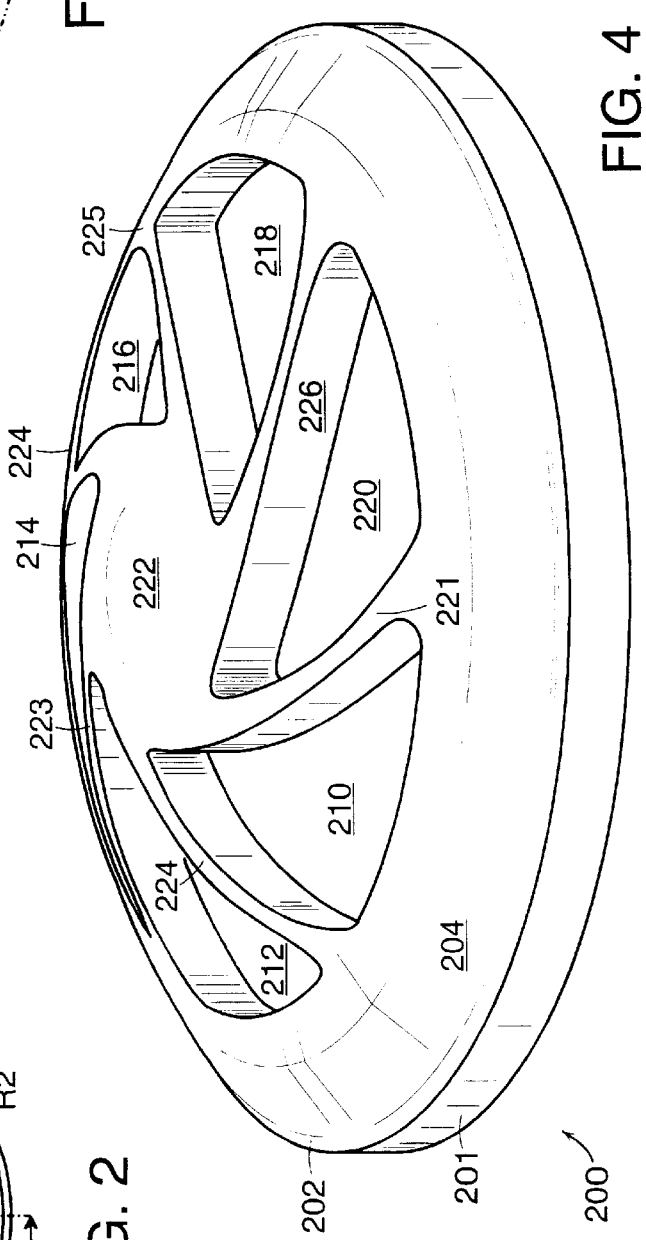
FIG. 4 is a perspective view illustrating a second embodiment of a PCD substrate with concentric, spaced depressions.

Turning now to a second embodiment, FIG. 4 illustrates a substrate 200. The substrate 200 has a generally flat base 201, upon which is mounted a generally curved, parabolic shaped surface 104. An outside perimeter groove 202 exists at the interface between the base 201 and the parabolic surface 204. Mounted on the curved surface 204 are a plurality of generally non-linear delta shaped depressions 210, 212, 214, 216, 218 and 220 which are adapted to contain the superhard material. These non-linear delta-shaped depressions are symmetrical in relation to each other and are concentrically placed around a central axis 222 of the substrate surface 204. Each of the non-linear delta depressions 210–220 has an apex 224 which is positioned on an inner circle 223 whose center is the central axis 222. Further, from the apex 224, the groove 220 projects outwardly from the inner circle 223 toward an outer circle 225.

Figure 5:
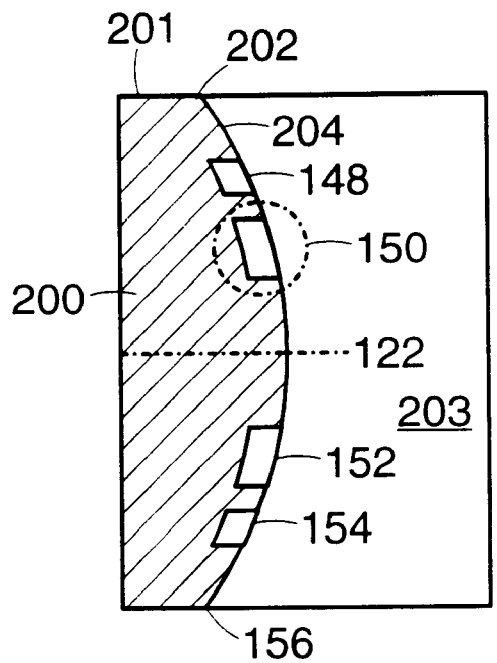
FIG. 5 is a side, cross-sectional view of the substrate of FIG. 4 along lines A—A.

FIG. 5 shows a side, cross-sectional view of the substrate 200 (FIG. 4). The substrate 200 is shown with the flat base 201 supporting the generally convex surface 204. Grooves 102 and 156 are positioned at the interface between the convex surface 204 and the flat base 201. Further, a plurality of cuts 148, 150, 152 and 154 are recessed within the convex surface 104 and are symmetrical to the central axis 122. A table 203 engages the substrate 200 at cuts 148, 150, 152 and 154. The substrate 200 thus provides an increased diamond cutting surface at its perimeter to provide more superhard materials. The presence of additional superhard materials at the perimeter of the cutting element leads to a longer wear life and an increased resistance to percussions during operation. The base 201 is about 0.1 inch in height and has a radius of about 1 inch. Further the top of the convex surface 204 projects about 0.15 inches above the base 201.

Figure 6:
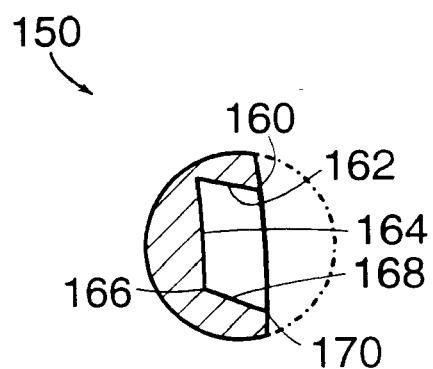
FIG. 6 is a side, cross-sectional view of an enlarged portion of the substrate of FIG. 5.

Referring now to FIG. 6, details of the recess 150 are shown. The recess 150 has generally angled sidewalls 162 and 168. The recess 150 also has a base section 164. At junction points 160, 163, 166 and 170, smooth edges are provided to minimize stress points which may result. Each of the sidewall 162 is about 0.04 inches and are curved with a 12° arc. Further, each of the junction points 160–170 has a radius of about 0.007 inches.

Figure 7:
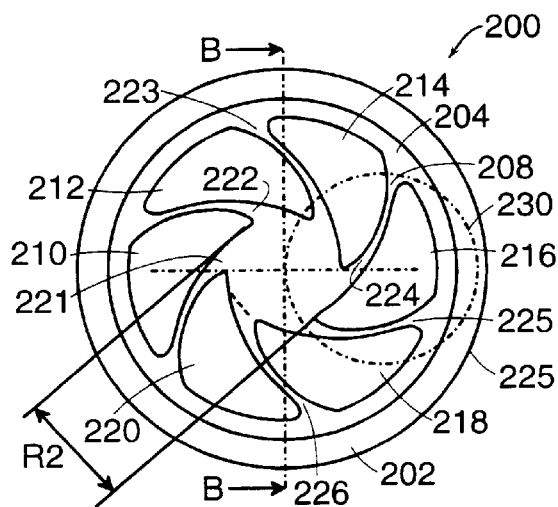
FIG. 7 is a front view of the substrate of FIG. 4.

Referring now to FIG. 7, a front view of the substrate 200 of FIG. 6 is shown. In FIG. 7, the groove 202 exists at the rim of the substrate 200. Additionally, the plurality of generally curved delta depressions 210–220 are positioned concentrically on the surface 204 of the substrate 200. Further, each of depressions 21014 220 has a non-linear shape that generally resembles a delta or a triangle whose apex is positioned on the inner circle 223 having a radius R2 and the outer circle 225. Additionally, each pair of adjacent depressions 210–220 is separated by a region 208.

Figure 8:
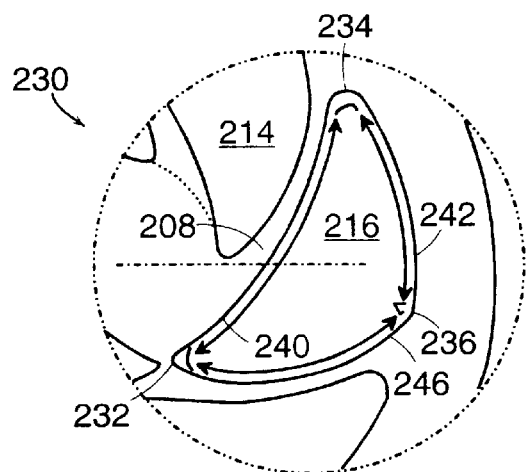
FIG. 8 is a front view illustrating an expanded view of a portion of the substrate of FIG. 7.

An enlarged portion 230 of the substrate 200 is shown in more detail in FIG. 8. As shown therein, the depression 216 takes the shape of a generally smoothed delta or triangle having an apex 232 which is positioned on the inner circle 223 with a radius R2 (FIG. 7) and base points 234 and 236. Points 234 and 236 are positioned on the outer circle 225 (FIG. 7). Each of points 232, 234 and 236 is curved to avoid abrupt transitions which may increase the stress within the substrate 200. Additionally, edges 240, 242 and 246 connecting the apex 232 and base points 234 and 236 are also curved or smoothed to avoid abrupt changes. A curved region 208 between depressions 214 and 216 becomes narrower as the region 208 approaches the outer circle 225 of the cutter 200.

Figure 9:
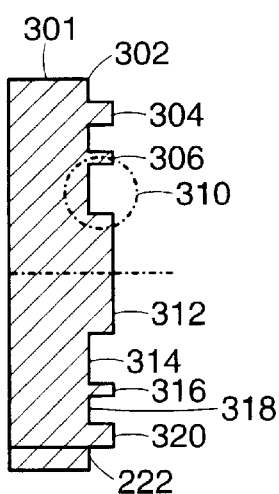
FIG. 9 is a side, cross-sectional view of a third embodiment of a substrate.

Turning now to FIG. 9, a side cross sectional view of a third embodiment of the substrate is shown. The substrate 300 has the base 301 with a generally planar surface 304. Grooves 302 and 356 are positioned at the interface between the generally planar surface 304 and the generally flat base 301. On the generally flat surface 304, a plurality of ridges 304, 306 and corresponding recesses 314, 328, and 322 exist which are concentric to the focal point 322.

Figure 10:
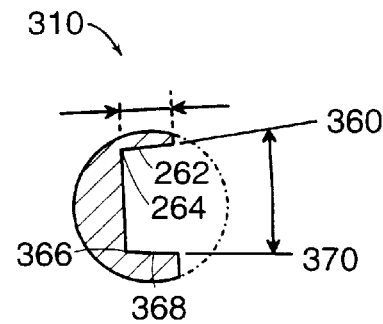
FIG. 10 is an enlarged side, cross-sectional view of a portion of the substrate of FIG. 9.

Referring now to FIG. 10, details of the recess 310 are shown. In FIG. 10, the recess 310 has sidewalls 362 and 368. The recess 310 also has a base section 364. At junction points 360, 363, 366 and 370, smooth edges are provided to minimize fractures, as caused by stress during manufacturing or during use.

During manufacturing, a predetermined amount of diamond crystals and a tungsten carbide substrate are placed within an enclosure. The enclosure is typically made from molybdenum, tantalum or niobium, although nearly any refractory metal may be used. The enclosure is then subject to a high pressure, high temperature cycle of at least 50 kilobars and 1200° C. for 2–120 minutes. A binding material in a substrate consolidates and binds the diamond crystals into a single sintered polycrystalline mass. Additionally, various metallic additives maybe mixed with the diamond crystal to provide for the correct stochiometry of the sintered system. These materials may include, but are not limited to W, VC, WC, TaC, Cr, Ti, Co, and Ni. These additives provide two improvements: 1) they tend to decrease the carbon rich stochiometry of the sintered system and 2) they provide an evenly dispersed seed site for diamond grain growth nucleation.

Although the non-planar, non-linear substrate has been shown with specific numbers of protrusions or depressions, any number of protrusions or depressions with similar or dissimilar profiles, depths, heights, pitch, paths and fillets may be used, including those of U.S. patent application Ser. No. 08/922,038, entitled "CUTTING ELEMENT WITH A NON-PLANAR, NON-LINEAR INTERFACE," filed on Sep. 2, 1997 by John B. Yorston and Deepthi R. Setlur, hereby incorporated by reference. The protrusions or depressions may be centrally positioned or may be non-symmetrical or offset from the center of the substrate.

It is to be understood that the above-described arrangements are only illustrative of an application of the present invention. Any modifications and alternative arrangements may be devised by those skilled in the art without departing from the spirit and scope of the present invention and the appended claims are intended to cover such modifications and arrangement.

What is claimed is:

1. A cutting element, comprising:
   a substrate having a surface and one or more non-planar, non-linear protrusions concentrically mounted on the surface and spaced apart; and
   a table having a superhard material bonded to the substrate, the table having one or more depressions adapted to engage the one or more non-planar, non-linear protrusions.

2. The cutting element of claim 1, further comprising a channel running between adjacent protrusions.

3. The cutting element of claim 2, wherein each protrusion has an apex positioned near a center of the element and a base positioned toward a perimeter of the element, further comprising a channel between protrusions, said channel having a width which is wider at the apex than at the base of the protrusions.

4. The cutting element of claim 1, wherein each protrusion has an apex positioned near a center of the element and a base positioned toward a perimeter of the element, and wherein each protrusion has varying depths and the depth of the protrusion at the apex is different than the depth at the base.

5. The cutting element of claim 1, wherein each protrusion has an apex positioned near a center of the element and a base positioned toward a perimeter of the element, and wherein each protrusion has varying widths and the width of the protrusion at the apex is different than the depth at the base.

6. The cutting element of claim 1, wherein each protrusion has non-linear edges.

7. The cutting element of claim 1, wherein each protrusion is delta-shaped.

8. The cutting element of claim 1, further comprising a channel running between adjacent protrusions, wherein each protrusion has an apex positioned near a center of the element and a base positioned toward a perimeter of the element, and wherein the channel is narrower at the apex than at the base of the protrusion.

9. The cutting element of claim 1, wherein each non-linear surface is convex.

10. The cutting element of claim 1, further comprising a base.

11. A cutting element, comprising:
    a substrate having a surface and one or more non-planar, non-linear depressions concentrically mounted on the surface and spaced apart; and
    a table having a superhard material bonded to the substrate, the table having one or more protrusions adapted to couple to the one or more non-planar, non-linear depressions.

12. The cutting element of claim 11, further comprising a wall running between adjacent depressions.

13. The cutting element of claim 12, wherein each depression has an apex positioned near a center of the element and a base positioned toward a perimeter of the element, and a wall separating each depression, wherein the wall is wider at the apex than at the base of the depressions.

14. The cutting element of claim 11, wherein each depression has an apex positioned near a center of the element and a base positioned toward a perimeter of the element, and wherein each depression has varying depths and the depth of each depression at the apex is less than the depth at the base.

15. The cutting element of claim 11, wherein each depression has an apex positioned near a center of the element and a base positioned toward a perimeter of the element, and wherein the depression has varying widths and the width of the depression at the apex is less than the depth at the base.

16. The cutting element of claim 11, wherein each depression has non-linear-sides.

17. The cutting element of claim 11, wherein each depression is delta-shaped.

18. The cutting element of claim 11, further comprising a wall running between adjacent depressions, wherein each depression has an apex positioned near a center of the element and a base positioned toward a perimeter of the element, and wherein the wall is narrower at the apex than at the base of the depression.

19. The cutting element of claim 11, further comprising:
    a tungsten carbide layer;
    a polycrystalline diamond (PCD) layer mounted on the tungsten carbide layer; and
    one or more metallic additives mixed with the PCD layer.

20. The cutting element of claim 19, wherein the metallic additives include W, VC, WC, TaC, Cr, Ti, Co, and Ni.

* * * * *